US012811384B2

(12) United States Patent
Etzler et al.

(10) Patent No.: US 12,811,384 B2
(45) Date of Patent: Nov. 24, 2026

(54) HOTLINE CLAMP FOR COVERED CONDUCTORS

(71) Applicant: Preformed Line Products Co., Mayfield Village, OH (US)

(72) Inventors: Andrew John Etzler, Streetsboro, OH (US); Benjamin Franklin Ciesielczyk, Madison, OH (US); Douglas Arthur Bell, Mayfield Heights, OH (US); Kenneth Michael Akiki, Lyndhurst, OH (US)

(73) Assignee: Preformed Line Products Co., Mayfield Village, OH (US)

( * ) Notice: Subject to any disclaimer, the term of this patent is extended or adjusted under 35 U.S.C. 154(b) by 257 days.

(21) Appl. No.: 18/178,489

(22) Filed: Mar. 3, 2023

(65) Prior Publication Data

US 2023/0283058 A1 Sep. 7, 2023

Related U.S. Application Data

(60) Provisional application No. 63/316,357, filed on Mar. 3, 2022.

(51) Int. Cl.
*H02G 7/14* (2006.01)
*F16F 7/104* (2006.01)

(52) U.S. Cl.
CPC ............... *H02G 7/14* (2013.01); *F16F 7/104* (2013.01)

(58) Field of Classification Search
CPC .. F16F 2230/0005; F16F 222/08; F16F 7/104; F16F 7/108; H02G 7/14
USPC ........................................................... 174/42
See application file for complete search history.

(56) References Cited

U.S. PATENT DOCUMENTS 2,688,047 A * 8/1954 Macintyre ................ H02G 7/14 174/42
4,707,051 A 11/1987 Hall
10,193,319 B2 * 1/2019 Barry ..................... H02G 7/053

FOREIGN PATENT DOCUMENTS

EP 1315263 A1 5/2003

OTHER PUBLICATIONS

International Search Report; Corresponding International Patent Application No. PCT/US2023/063742, mailed Jul. 24, 2023; 4 Pgs.

* cited by examiner

*Primary Examiner* — Tremesha W Burns
(74) *Attorney, Agent, or Firm* — Cooper Legal Group, LLC

(57) ABSTRACT

A vibration damper for damping vibrations of a cable includes an attachment portion configured to be attached to the cable while the cable is energized. The vibration damper also includes a flexible leg portion attached to the attachment portion. The vibration damper further includes a weighted portion attached to the flexible leg portion. The weighted portion is spaced a separation distance from the attachment portion and the weighted portion is movable relative to the attachment portion via the flexible leg portion to dampen the vibrations.

20 Claims, 15 Drawing Sheets

HOTLINE CLAMP FOR COVERED CONDUCTORS

CROSS REFERENCE TO RELATED APPLICATIONS

This application claims priority to U.S. Provisional Patent Application No. 63/316,357, filed on Mar. 3, 2022, entitled "HOTLINE CLAMP FOR COVERED CONDUCTORS," which is hereby incorporated by reference herein.

TECHNICAL FIELD

The present disclosure relates generally to electrical utility lines, and further relates to vibration dampers utilized upon electrical utility lines (e.g., electrical power lines).

BACKGROUND

Dampers for electrical utility lines respond to wind induced line vibration and help to dissipate vibration energy of oscillations. In particular, there may be interest to dampen line vibration that may be characterized by high frequency, low amplitude motion, e.g., aeolian vibration. Such dampers are placed upon the suspended, extending electrical lines.

There are various types of dampers. One example type of damper is a Stockbridge damper, which is generally comprises a short length of cable/rod that is clamped parallel to electrical utility line, with masses fixed at each end of the short cable/rod. Often, a damper, such as a Stockbridge damper, is clamped directly to electrical conducting material, e.g., the conductor, of the electrical utility line.

Some electrical utility lines include an electrically insulating sheathing material that covers the conductor of the electrical utility line. There may be several reasons for utilizing an electrical utility line that includes an electrically insulating sheathing material (e.g., plastic) that covers the conductor. For example, locations that may have vegetation that may contact an electrical utility line may be location selected to use an electrical utility line that includes an electrically insulating sheathing material that covers the conductor.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

According to an aspect, a vibration damper for damping vibrations of a cable includes an attachment portion configured to be attached to the cable. The attachment portion has an inner surface defining an opening whereby a hot stick placed in the opening. While in the opening, the hot stick can contact the inner surface to urge the attachment portion into contact with the cable while the cable is energized. The vibration damper also includes a flexible leg portion attached to the attachment portion. The vibration damper further includes a weighted portion attached to the flexible leg portion. The weighted portion is spaced a separation distance from the attachment portion and the weighted portion is movable relative to the attachment portion via the flexible leg portion to dampen the vibrations.

According to an aspect, a vibration damper for damping vibrations of a cable includes an attachment portion configured to be attached to the cable. The attachment portion has a first structure. The vibration damper also includes a keeper attached to the attachment portion. The keeper is movable from an open position to a closed position to facilitate attaching the attachment portion to the cable. The keeper has a second structure configured to cooperate with the first structure to maintain the keeper in a desired orientation relative to the attachment portion as the keeper moves from the open position to the closed position. The vibration damper further includes a flexible leg portion attached to the attachment portion. The vibration damper still further includes a weighted portion attached to the flexible leg portion, the weighted portion spaced a separation distance from the attachment portion and movable relative to the attachment portion via the flexible leg portion to dampen the vibrations.

According to an aspect, a vibration damper for damping vibrations of a cable includes an attachment portion configured to be attached to the cable. The attachment portion has a cable contact surface extending from a first end to a second end. The cable contact surface has a concave shape between the first end and the second end such that the cable contact surface is positioned on each of a first side of the cable, a top side of the cable, and a second side of the cable when the attachment portion is attached to the cable. The vibration damper also includes a flexible leg portion attached to the attachment portion. The vibration damper further includes a weighted portion attached to the flexible leg portion. The weighted portion is spaced a separation distance from the attachment portion and the weighted portion is movable relative to the attachment portion via the flexible leg portion to dampen the vibrations.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

Figure 1:
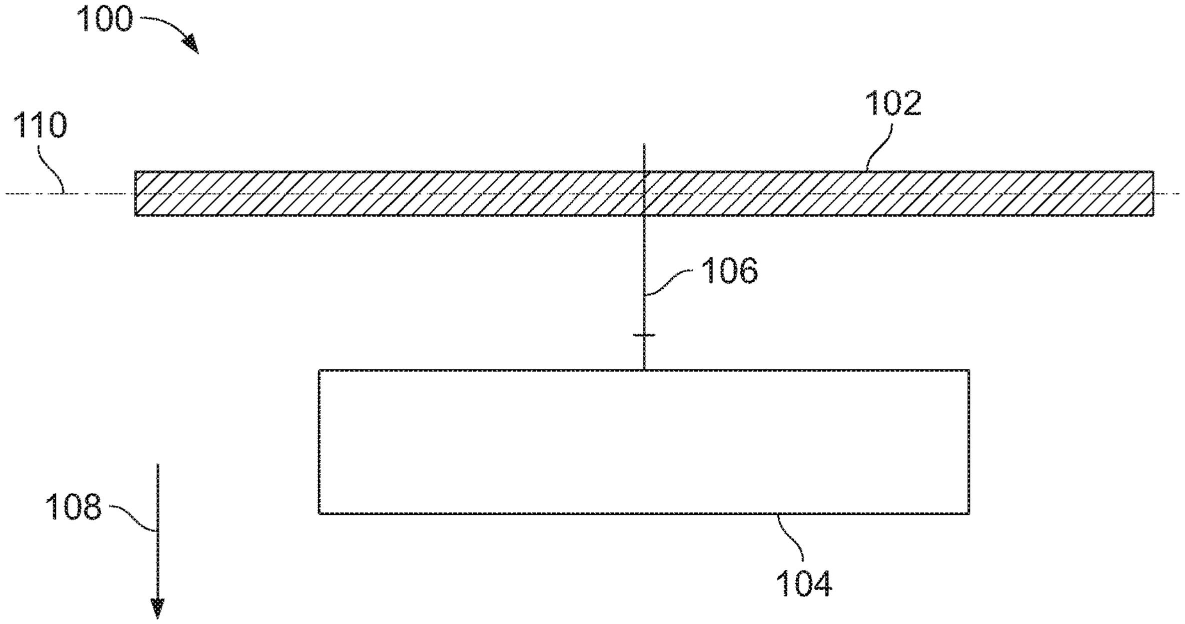
FIG. 1 illustrates a schematic representation of an example vibration damper system.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Climate at some locations, e.g., in the state of California and surrounding areas, may be prone to promotion of wildfires. It has been found recently that vegetation has come into contact with exposed and degraded power distribution systems, thereby causing wildfires. To mitigate the risk and likelihood of these occurrences, multiple power utility providers have begun installing multi-layered, plastic-jacketed conductors ("covered conductors") throughout their systems.

Within some examples, the plastic-jacketed conductors ("covered conductors") may be compliant with UL-94 specification. UL-94 details testing and standards for the flammability of plastic materials. Accordingly, the examples of plastic-jacket specify material must conform to V-0 requirements per UL-94. In general, the requirement includes that the material must self-extinguish (e.g., not promote flame spread) and produce no flaming "drips" of material that would ignite flammable or combustible materials below the covered conductors.

With these new conductors, new hardware, improved hardware, etc. is needed as the plastic jacket can act very differently than examples of bare conductor (e.g., bare stranding) conductors that have been frequently in use. One example type of hardware that may benefit from modifications is the vibration damper such as a Stockbridge vibration damper.

Referring to FIG. 1, an example damper system 100 is illustrated in a schematic elevation view. In some examples, the damper system 100 comprises a cable 102 that may be an electrically conductive or non-conductive wire, cable, line, rope, fiber, fiber optic, T2 conductor, etc. The remainder of this disclosure will use the term "cable" and its various forms synonymously with the term "conductor" and its various forms as described above. In particular, the cable 102 will be described as a plastic-jacketed cable or "covered cable." The cable 102 may include any number of materials including metal materials (e.g., conductors), non-metal materials (plastics, composite materials, etc.), or the like, that may or may not be implemented to provide utility services and/or products. The cable 102 can support one or more structures, such as robots, vibration dampers, etc. In some examples, a goal of the damper system 100 may be to reduce and/or attenuate (e.g., damping) unwanted vibrations of the cable 102. The cable 102 may vibrate due to environmental effects such as wind, precipitation, etc., or from objects/animals contacting the cable 102. It is often the case that the described vibration of the cable 102 can damage the cable 102 and the associated components used to suspend the cable 102. As such, it can be beneficial to reduce or eliminate the vibration of the cable 102. In some examples, the undesired vibration affecting the cable includes Aeolian vibrations.

The damper system 100 comprises a vibration damper 104. In an example, the vibration damper 104 can be attached to (e.g., suspended from) the cable 102 by an attachment structure 106. The attachment structure 106 may include a hook, clamping mechanism, or other types of mechanical fasteners that function to attach the vibration damper 104 to the cable 102. In this way, the vibration damper 104 may be secured to the cable 102 and limited from being inadvertently detached and/or separated from the cable 102. As will be described herein, the vibration damper 104 can reduce and/or attenuate vibrations that are experienced by the cable 102. In more common examples, the vibration damper 104 is hanging beneath the cable 102 such that gravity is acting in a downward direction 108 in FIG. 1. In some examples, the cable 102 is extends along a cable axis 110. It is also to be understood that the cable 102 and the cable axis 110 need not be horizontal as shown, but can also have curvilinear shapes such as an arc, a sinusoidal wave pattern, etc. In some examples, the vibration damper 104 can be secured to the cable 102 at or near a local minimum elevation point between two or more supporting structures such as poles, towers, etc.

In at least some previous applications, a vibration damper having a clamp and a keeper are bolted directly to the cable. However, for a covered conductor or covered cable, research has shown that damage to the outer jacketing of the cable may occur. It is possible that damage may rise to an unacceptable extent such that the clamp may lose a significant portion of its application torque or application force. Such undesired effects may allow a vibration damper clamp to loosen and potentially fall from the cable.

It is to be appreciated that a known one-piece clamp design attaches to the conductor via helical steel rods coated in a flame-retardant TPU. These dampers are easy, though time-consuming, to install by hand but are very difficult to install via "hot-stick" (necessary when the line is already energized).

Figure 2:
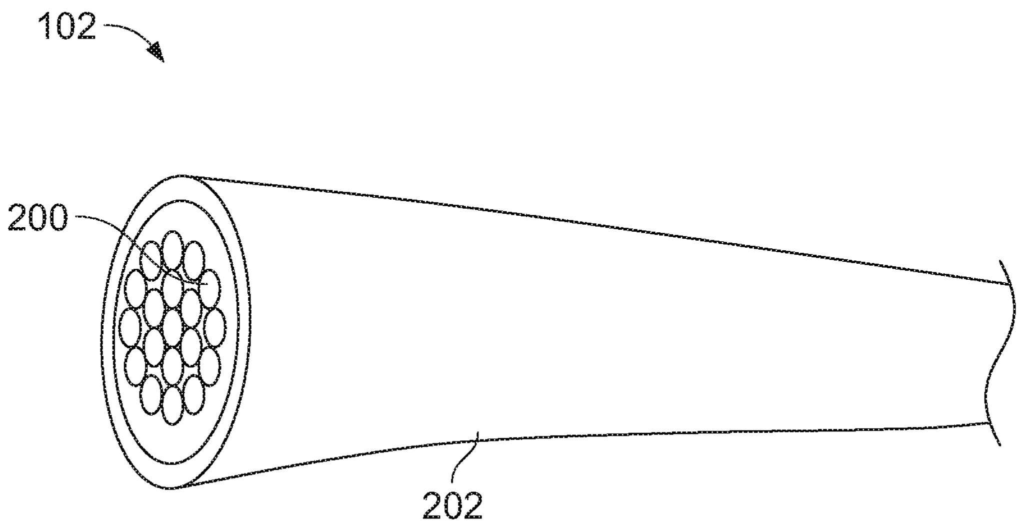
FIG. 2 illustrates a section of an example cable.

Referring to FIG. 2, a section of cable 102 is illustrated. The cable 102 is an electrical conductor including cabled strands 200 of material that can comprise one or more electrically conductive metal alloys and/or strength members. The cabled strands 200 can be surrounded or enveloped by a plastic jacket 202 as previously described. The plastic jacket 202 can include one or more layers of plastic material. It is to be understood that multiple layers of plastic material forming the plastic jacket 202 may include different plastic materials.

Figure 3:
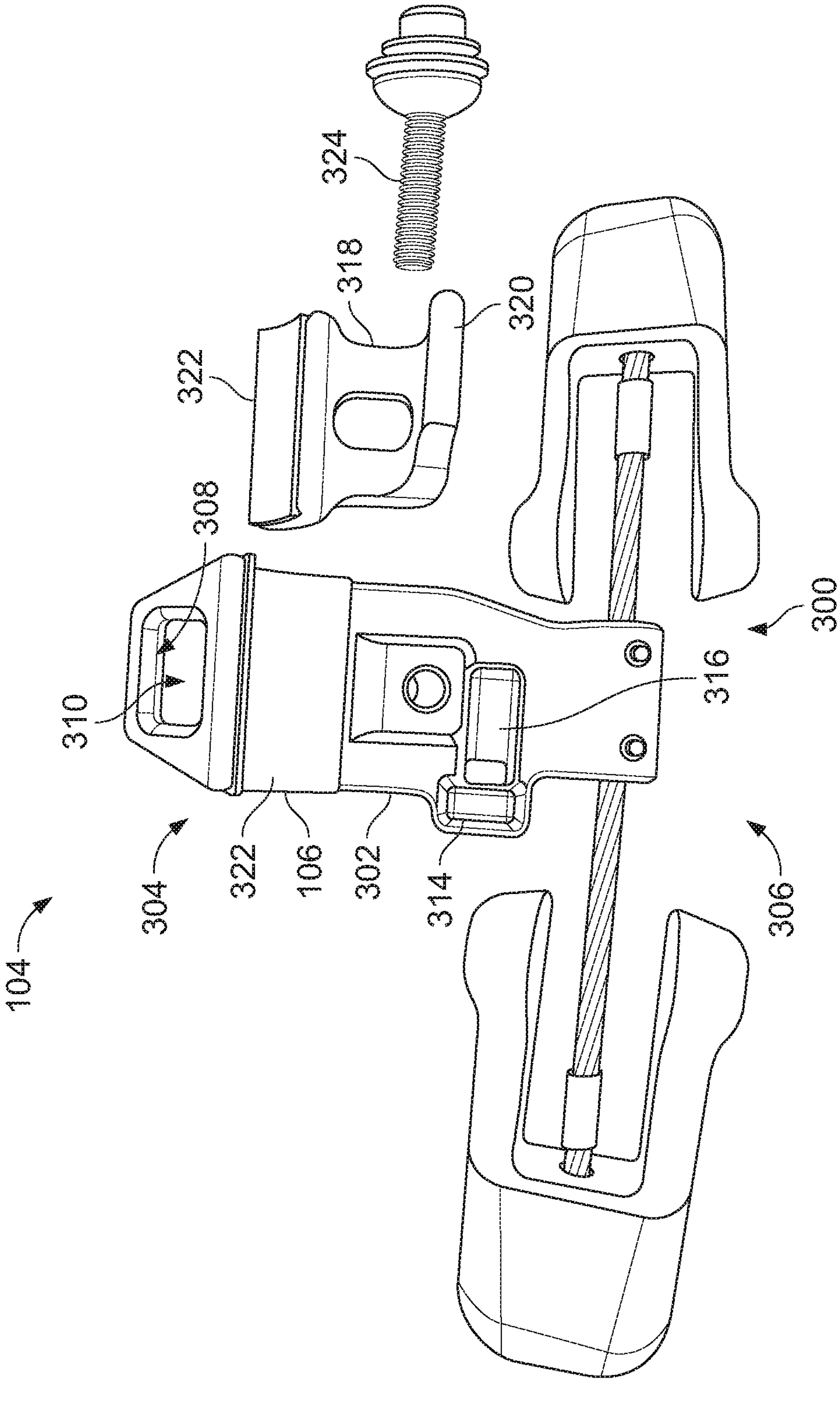
FIG. 3 illustrates a disassembled vibration damper viewed from a first side.

Referring to FIG. 3, a disassembled vibration damper 104 viewed from a first side 300 is illustrated. The vibration damper 104 includes an attachment portion 302 configured to be attached to the cable 102 (not shown in FIG. 3). The attachment portion 302 can extend from an upper end 304 to a lower end 306. In many instances, the upper end 304 will be higher in elevation than the lower end 306, as the lower end will often be hanging below the cable 102. The attachment portion 302 can be constructed of any suitable material having material properties suited to the expected loads during typical operation.

The upper end 304 of the attachment portion 302 can include an inner surface 308 defining an opening 310. A hot stick (shown in FIG. 4) placed in the opening 310 can contact the inner surface 308 to urge the attachment portion 302 into contact with the cable 102 while the cable 102 is energized. It is to be appreciated that the hot stick can include any one of various attachments that can be used to move, grab, manipulate, etc. components such as the described vibration damper 104 and others. As such, a portion of a hot stick or a hot stick attachment can contact the inner surface 308 with any suitable surface or structure to effectively lift the vibration damper 104 to the cable 102 in preparation for attachment of the vibration damper 104 to the cable 102. In some examples, the inner surface 308 and the opening 310 can be described as an integrated or "built-in" hanging loop.

Remaining with FIG. 3, the upper end 304 of the attachment portion 302 can also include an attachment structure 106 attached to the attachment portion 302 and configured to attach the attachment portion 302 to the cable 102. In some examples, the attachment structure 106 includes a J-shape, or a fish hook shape. When the attachment portion 302 is attached to the cable 102, a portion of the exterior surface (e.g., the plastic jacket 202) of the cable 102 will contact the curved portion of the J-shape, or fish hook shape of the attachment structure 106 to be cradled or gripped in a desired location.

In some examples, the attachment portion 302 can include a first structure 314. Forms of the first structure 314 can vary, however, in the shown example, the first structure 314 is a platform-like volume raised away from the first side 300 of the attachment portion 302. In some examples, the attachment portion 302 can also include a second platform-like volume 316 formed away from the opposite side of the attachment portion 302. This combination of the first structure 314 and the second platform-like volume 316 can define an interior wall bounding a cylindrical volume designed to accept a part of a keeper 318 to help attach the keeper 318 to the attachment portion 302. As shown, a second structure 320 such as a cylindrical-shaped extension of the keeper 318 can cooperate with the first structure 314 of the attachment portion 302. This cooperation can limit the degrees of freedom of the keeper 318 while moving relative to the attachment portion 302. In some examples, the second structure 320 is configured to cooperate with the first structure 314 to maintain the keeper 318 in a desired orientation relative to the attachment portion 312 as the keeper 318 moves from an open position to a closed position which will be described below.

In some examples, a resilient material 322 is attached to at least one of the attachment portion 302 or the keeper 318 to avoid possible damage to the cable 102. The resilient material 322 can include rubber compounds or other, similar materials that are relatively pliable in comparison to materials used for the attachment portion 302, the attachment structure 106, and the keeper 318. The resilient material 322 can at least one of eliminate or reduce deformation to the plastic jacket 202 of the cable 102. In this way, the resilient material 322 can mitigate damage to the cable 102. The resilient material 322 can be attached to either one or both of the attachment portion 302 or the keeper 318 using an adhesive or any suitable attachment method. Furthermore, the resilient material 322 can include a concave face that cooperates with the convex exterior surface of the plastic jacket 202 of the cable 102.

A fastener 324 is also shown which helps attach the keeper 318 to the attachment portion 302. In some examples, the fastener 324 is a hex-head screw that can urge the keeper 318 toward the attachment portion 302 in a rotational motion as the keeper 318 rotates about an axis of the second structure 320. Of course, the fastener 324 can include any number of suitable fasteners and is not to be limited by the shown example.

Figure 4:
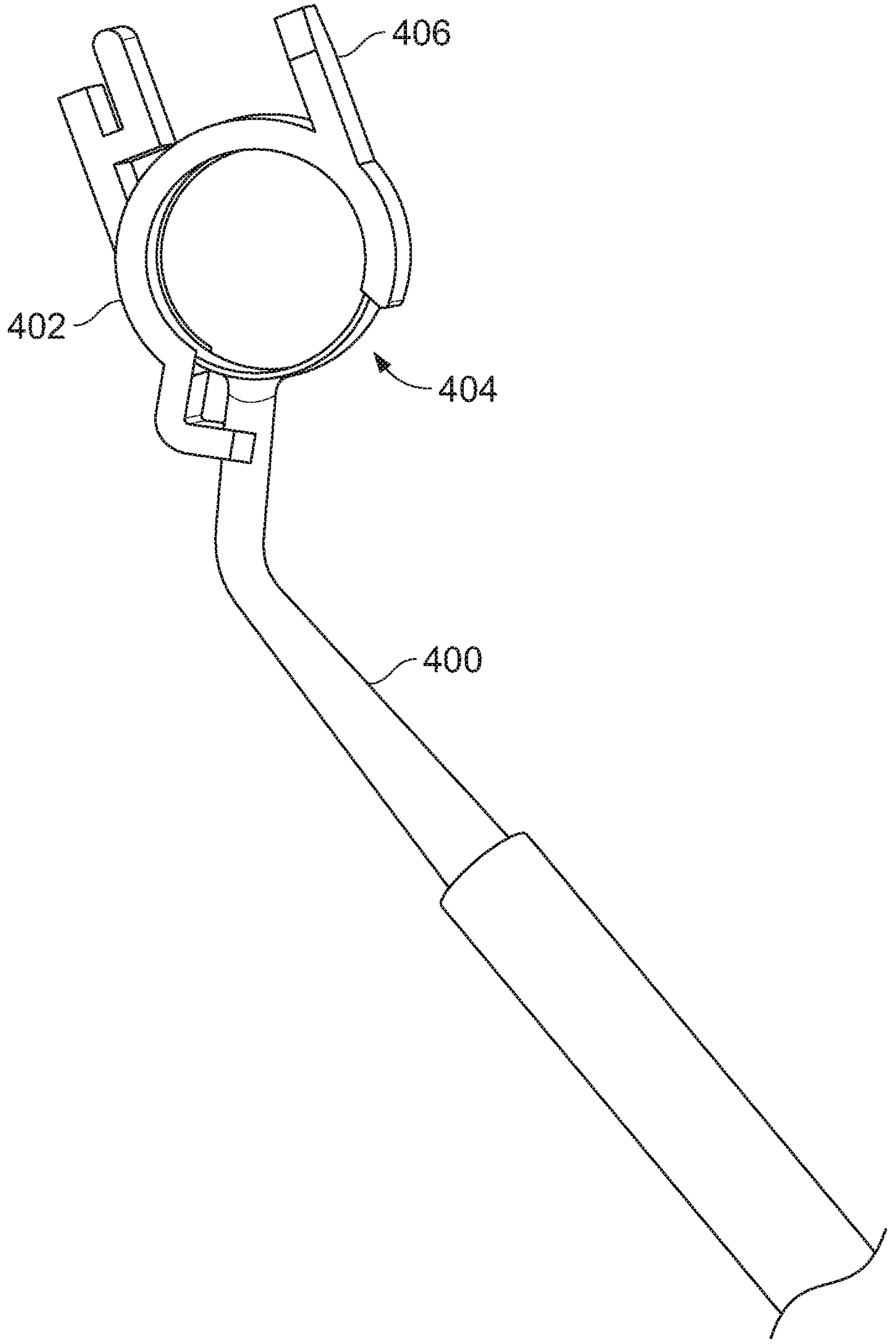
FIG. 4 illustrates an example hot stick.

Referring to FIG. 4, an example hot stick 400 and an associated hot stick attachment 402 are illustrated. The hot stick 400 can include a generally annular portion 404 at a distal end as do several known hot sticks. In some examples, the hot stick attachment 402 is snap-fit onto the annular portion 404 and can include any number and any type of finger 406 or movable surface to manipulate objects such as the vibration damper 104. It is to be appreciated that the shown hot stick 400 and associated hot stick attachment 402 are examples only, and other types may be required to manipulate the described vibration damper 104.

Figure 5:
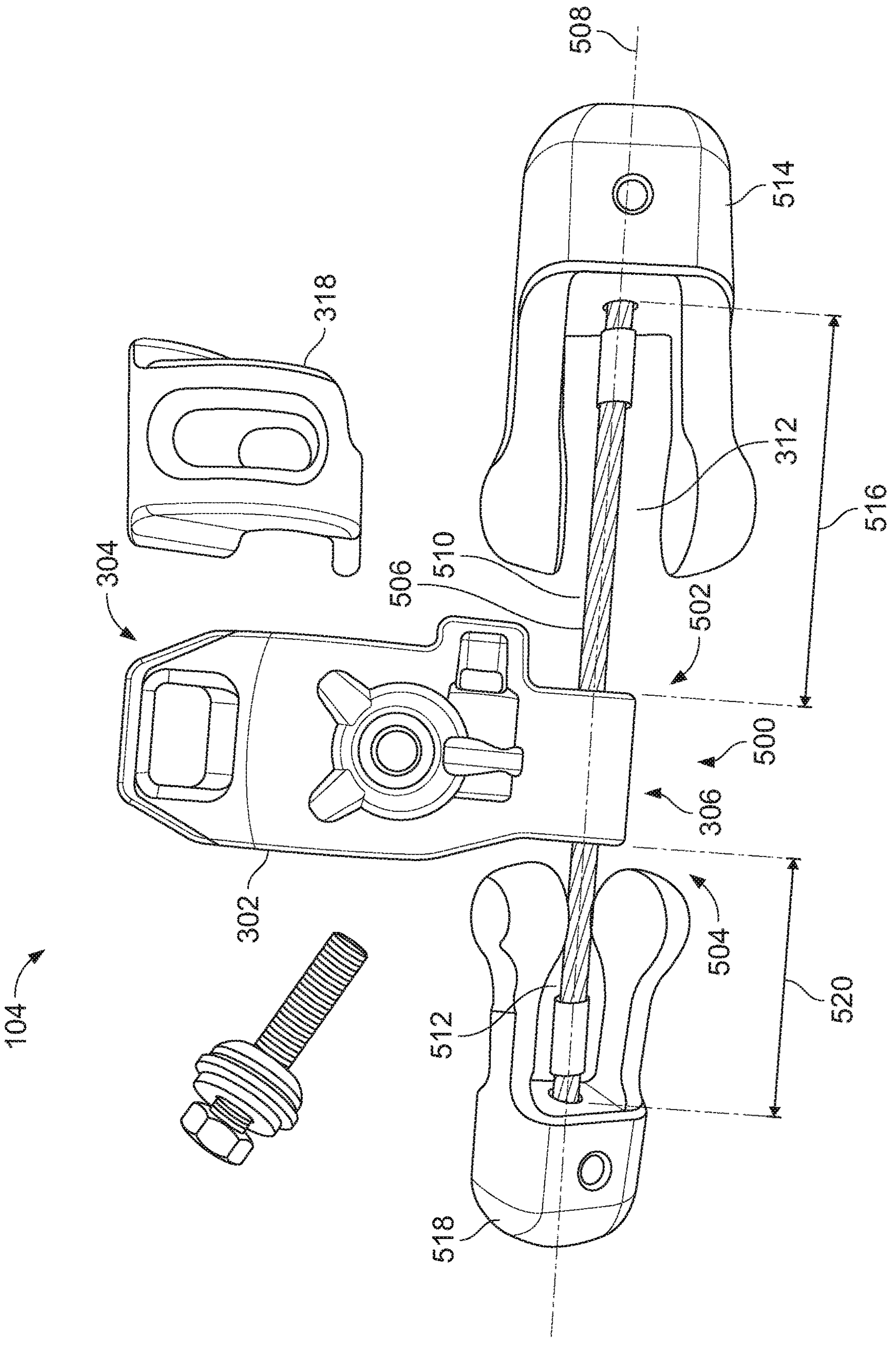
FIG. 5 illustrates the disassembled vibration damper viewed from a second side that is generally opposite the first side.

Referring to FIG. 5, the disassembled vibration damper 104 viewed from a second side 500 that is generally opposite the first side 300 is illustrated. As noted previously, the attachment portion 302 can extend from an upper end 304 to a lower end 306. The lower end 306 of the attachment portion 302 can have a first attachment side 502 and a second attachment side 504. A flexible leg portion 506 is attached to the attachment portion 302. In some examples, the lower end 306 of the attachment portion 302 surrounds a portion of the flexible leg portion 506 to attach the flexible leg portion 506 to the attachment portion 302. In some examples, the flexible leg portion 506 extends along a flexible leg axis 508.

Any suitable attachment structure or method of attachment can be used in conjunction with the present disclosure. In some examples, the attachment portion 302 is crimped around the flexible leg portion 506 to attach the flexible leg portion 506 to the attachment portion 302. In some examples, the flexible leg portion 506 extend through the attachment portion 302 such that the flexible leg portion 506 is continuous from the first attachment side 502 to the second attachment side 504.

The flexible leg portion 506 can be constructed in any suitable manner with various materials. The flexible leg portions 506 can comprise any number of materials, such as a braided wire, cable, or the like. In some examples, the flexible leg portion 506 may have at least some degree of flexibility and/or spring factor, such that the flexible leg portion 506 can bend, flex, and/or otherwise move in response to vibration forces. In the shown examples, the flexible leg portion 506 consists of individual strands that can be cabled or helically wound together. In some examples, the strands comprise a relatively rigid material that provides at least some degree of rigidity, inflexibility, strength, support, etc. In some examples, the strands can include a metal material.

In some examples, the flexible leg portion 506 can be known as a messenger or a messenger wire. The flexible leg portion 506 can include two or more layers of helically wound strands of high tensile steel wire. In some examples, the flexible leg portion 506 can be made of formed hard steel wires that are galvanized for corrosion resistance. However, the flexible leg portion 506 and can also be coated with a mischmetal coating or a bezinal coating as opposed to galvanization. It is to be understood that any suitable material is contemplated for the purposes of this disclosure.

Remaining with FIG. 5, a first portion 510 of the flexible leg portion 506 extends away from the first attachment side 502. Similarly, a second portion 512 of the flexible leg portion 506 extends away from the second attachment side 504. A weighted portion 514 is attached to the first portion 510 of the flexible leg portion 506, and the weighted portion 514 is spaced a separation distance 516 from the first attachment side 502 of the attachment portion 302. As can be appreciated, the weighted portion 514 is movable relative to the attachment portion 302 via the flexible leg portion 506 in order to dampen the vibrations experienced by the cable 102.

Similarly, a second weighted portion 518 is attached to the second portion 512 of the flexible leg portion 506. The second weighted portion 518 is spaced a second separation distance 520 from the second attachment side 504 of the attachment portion 302.

It is to be appreciated that the vibration damper 104 can be engineered and constructed in order to achieve desired attenuation or damping of the vibrations experienced by the cable 102. Some variables leading to effective damping can include a mass of the weighted portion 514 and a mass of the second weighted portion 518. Additionally, the separation distance 516 and the second separation distance 520 are also variables affecting the damping effectiveness. As such, there are examples of the described vibration damper 104 where the separation distance 516 and the second separation distance 520 are not equal. Furthermore, the size and geometry of the weighted portion 514 determining the mass of the weighted portion 514 are not the same as the size and geometry of the second weighted portion 518. These variables and others such as the spring factor of the flexible leg portion 506 can be engineered in innumerable combinations to achieve the desired damping effects.

Figure 6:
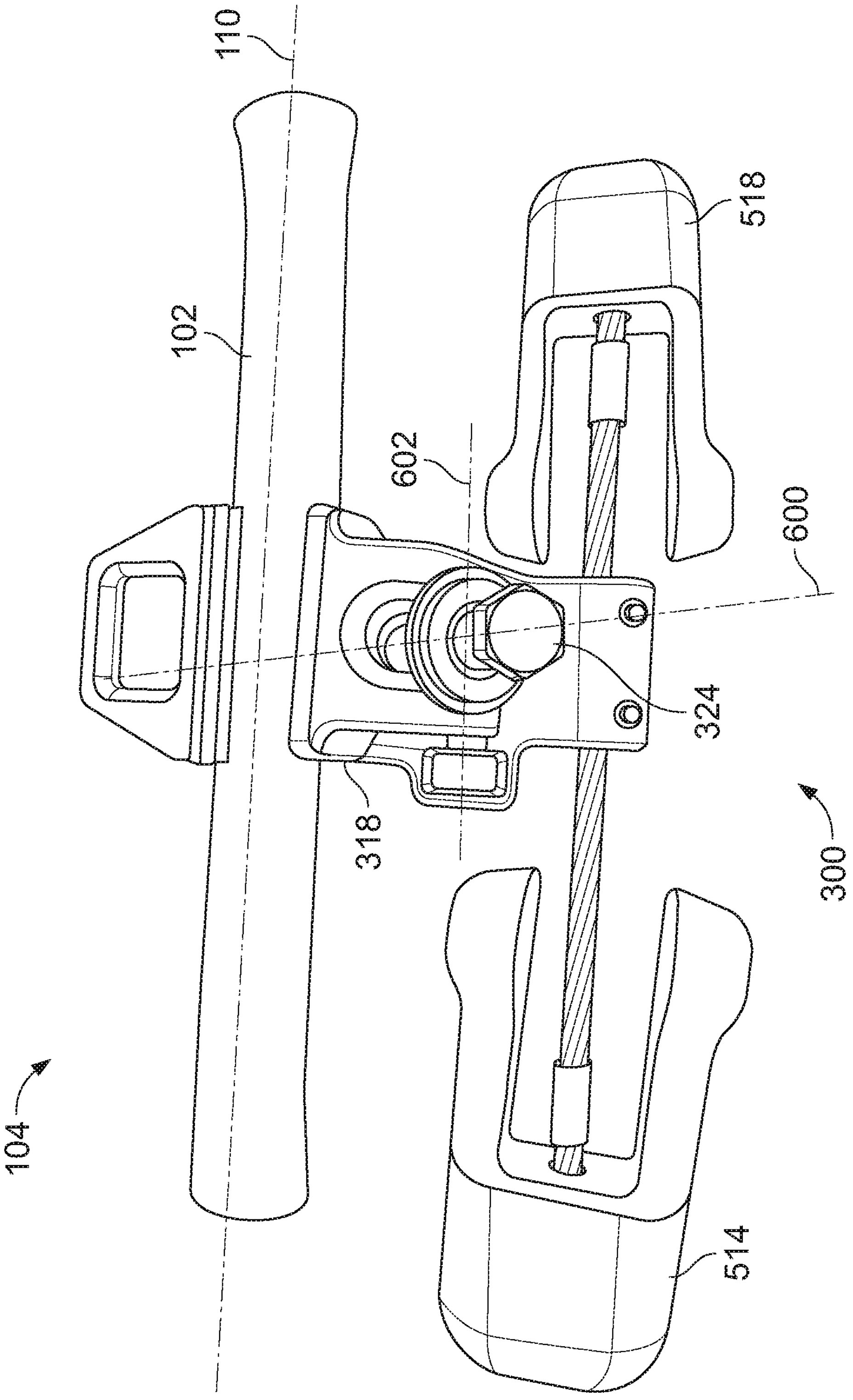
FIG. 6 illustrates an example vibration damper attached to a section of cable.

Referring to FIG. 6, an example vibration damper 104 attached to a section of cable 102 is illustrated. The view is shown from the first side 300 of the vibration damper 104. The fastener 324 extends along the axis 600 and passes through the keeper 318 and the attachment portion 302 which will be more fully described below. It is to be appreciated that the fastener 324 is not fully engaged as shown in FIG. 6, however, the fastener 324 can be referred to as a tightening fastener and can urge the keeper 318 into rotational motion about the axis 602 of the second structure 320.

Figure 7:
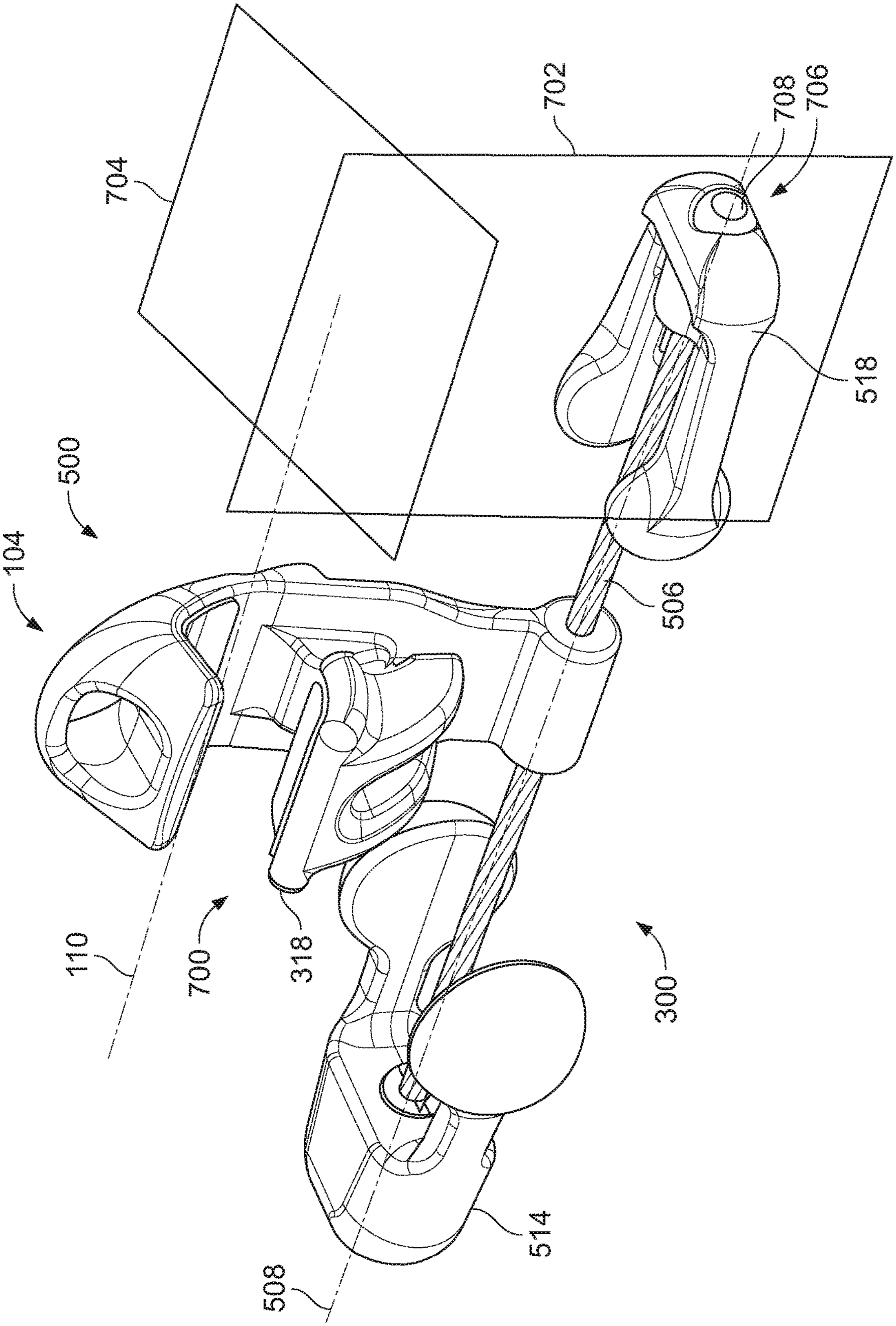
FIG. 7 illustrates a perspective view of an example vibration damper with a keeper in an open position.

Referring to FIG. 7, a perspective view of an example vibration damper 104 is illustrated with the keeper 318 in an open position 700. For additional clarity, the first side 300 and the second side 500 of the vibration damper 104 are labeled again in this figure. The cable 102 and the fastener 324 are not shown in order to promote clarity. In some examples, the cable 102 extends along the cable axis 110 while the flexible leg portion 506 extends along the flexible leg axis 508. The cable axis 110 and the flexible leg axis 508 lie within a first plane 702 that is perpendicular to a second plane 704 within which the cable axis 110 lies. In some examples, the first plane 702 is oriented vertically with respect to a horizontal ground surface (not shown), although it is to be appreciated that many cables 102 are suspended above surfaces that are angled with respect to horizontal surfaces or the ground surface may be undulating or otherwise rough. The second plane 704 is oriented horizontally with respect to the horizontal ground surface (e.g., parallel).

Also shown in FIG. 7, each of the weighted portion 514 and the second weighted portion 518 define an opening 706 into which a portion of the flexible leg portion 506 is received to attach the weighted portion 514 and the second weighted portion 518 to the flexible leg portion 506. Additionally, the vibration damper 104 can include a fitting 708 configured to attach the weighted portion 514 and the second weighted portion 518 to the flexible leg portion 506. Any suitable fitting can be used to attach the flexible leg portion 506 to the weighted portion 514 and the second weighted portion 518.

It can be beneficial to attach the weighted portion 514 and the second weighted portion 518 securely to the ends of the flexible leg portion 506 and this is conventionally done in any number of ways. The flexible leg portion 506 can be secured within the weighted portion 514 and the second weighted portion 518 by a staking ball. Specifically, a messenger hole can be drilled (or pre-cast) in the forked side of the weighted portion 514 and the second weighted portion 518. The openings 706 are sized to accept any diameter of the flexible leg portion 506. In some examples, the flexible leg portion 506 can be between 5 mm and 10 mm in diameter, but can be any diameter for transmitting vibrations.

Figure 8:
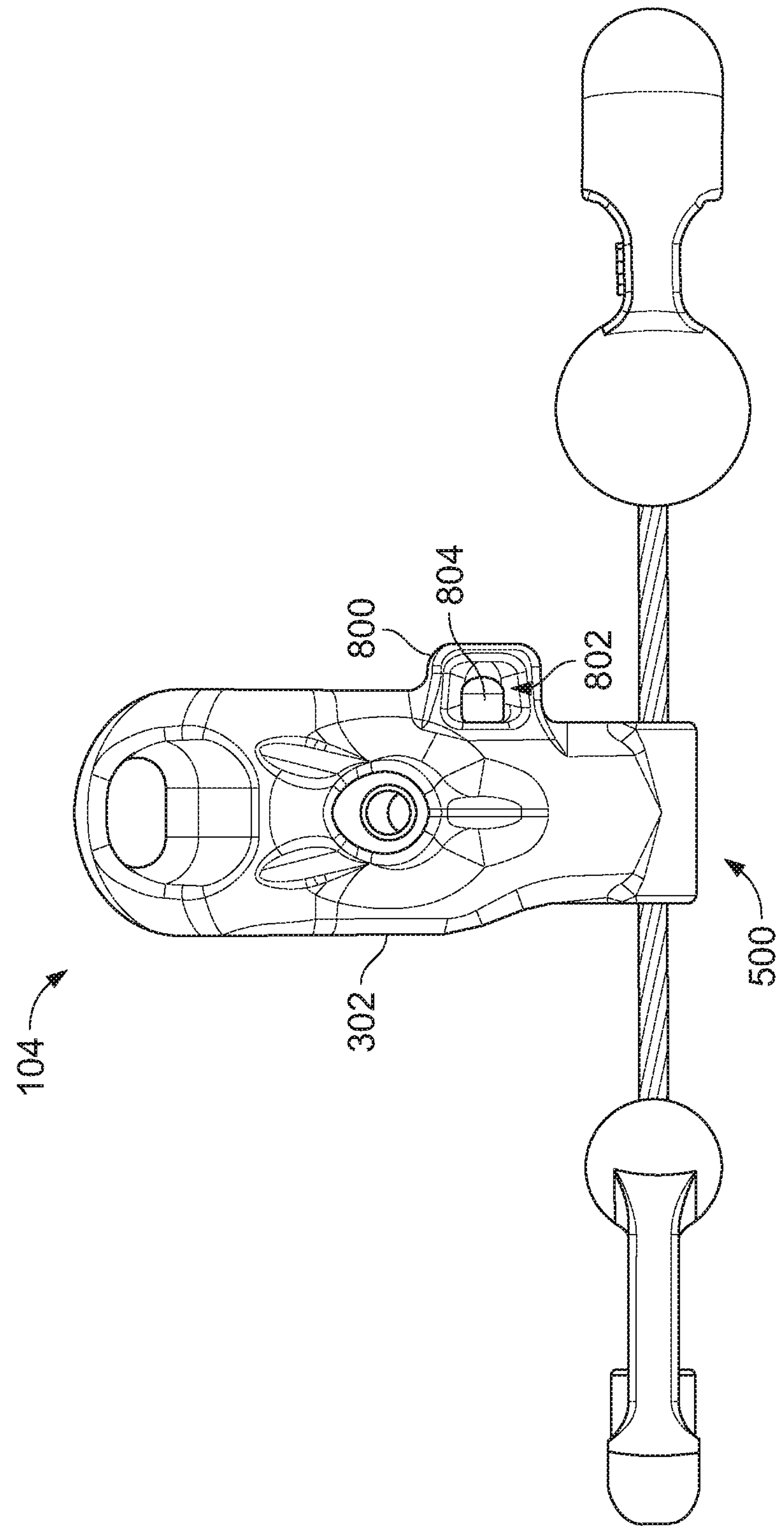
FIG. 8 illustrates an elevation view of the example vibration damper viewed from the second side.

Referring to FIG. 8, an elevation view of another example vibration damper 104 as viewed from the second side 500 is illustrated. As shown, the attachment portion 302 and the keeper 318 include portions that inter-fit to aid in keeping at least one of the keeper 318 or the attachment portion 302 from falling relatively away from at least one of the attachment portion 302 or the keeper 318. In this example, the attachment portion 302 includes a loop-like first structure 800 defines an aperture 802 passing through the attachment portion 302. The keeper 318 (behind the attachment portion 302) includes a second structure 804 that inter-fits with the aperture 802. In some examples, the second structure 804 has a curvilinear shape such that it passes through the aperture 802 as the keeper 318 rotates toward the attachment portion 302. In some examples, this described pairing of structures can act as a hinge.

Figure 9:
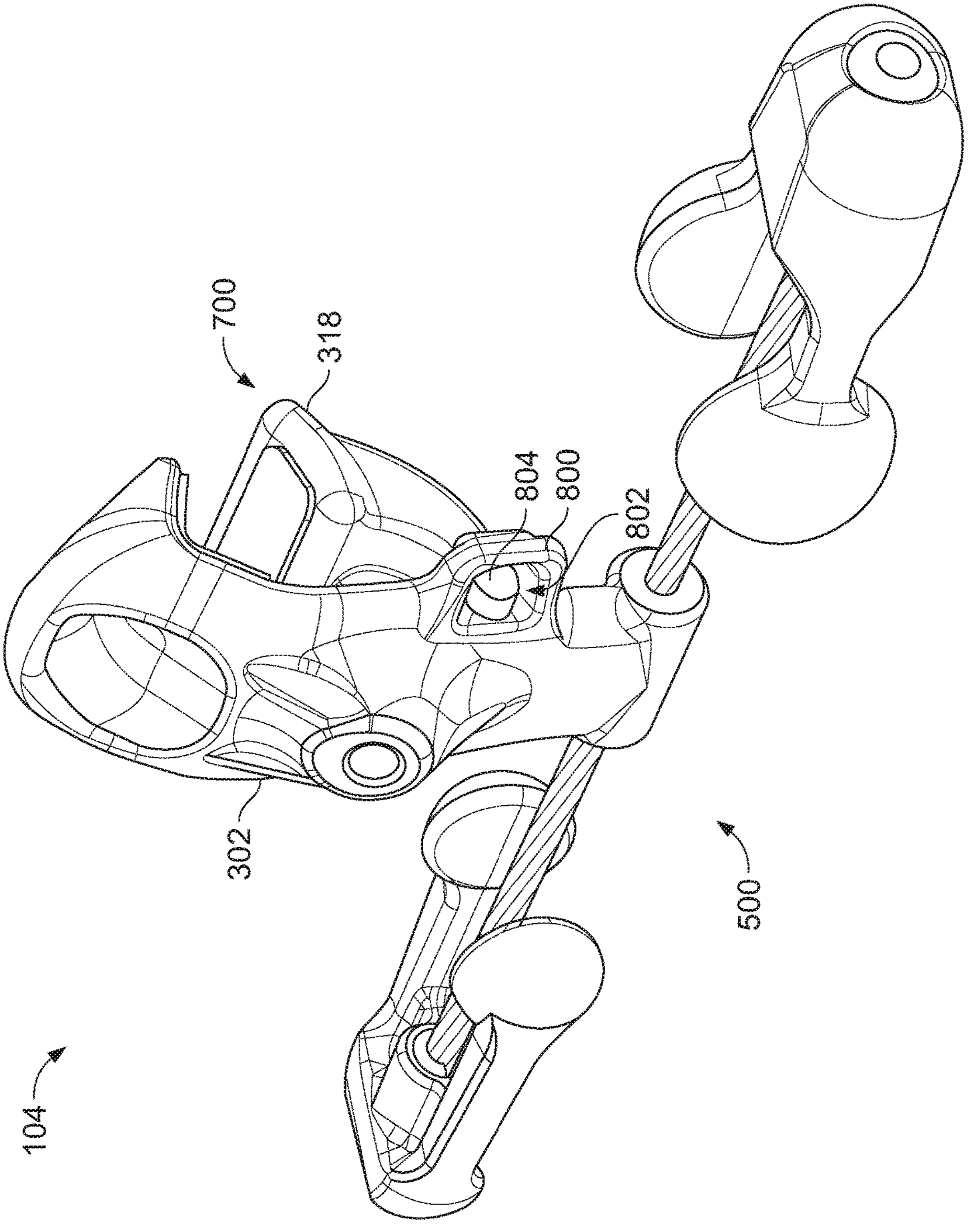
FIG. 9 illustrates a perspective view of the example vibration damper viewed from the second side.

Referring to FIG. 9, a perspective view of the vibration damper 104 viewed from the second side 500 is illustrated. Similar to FIG. 7, the keeper 318 is shown in the open position 700. The loop-like first structure 800 defines the aperture 802 passing through the attachment portion 302. The keeper 318 includes the second structure 804 that inter-fits with the aperture 802. In some examples, the second structure 804 has a curvilinear shape such that it passes through the aperture 802 as the keeper 318 rotates toward the attachment portion 302.

Figure 10:
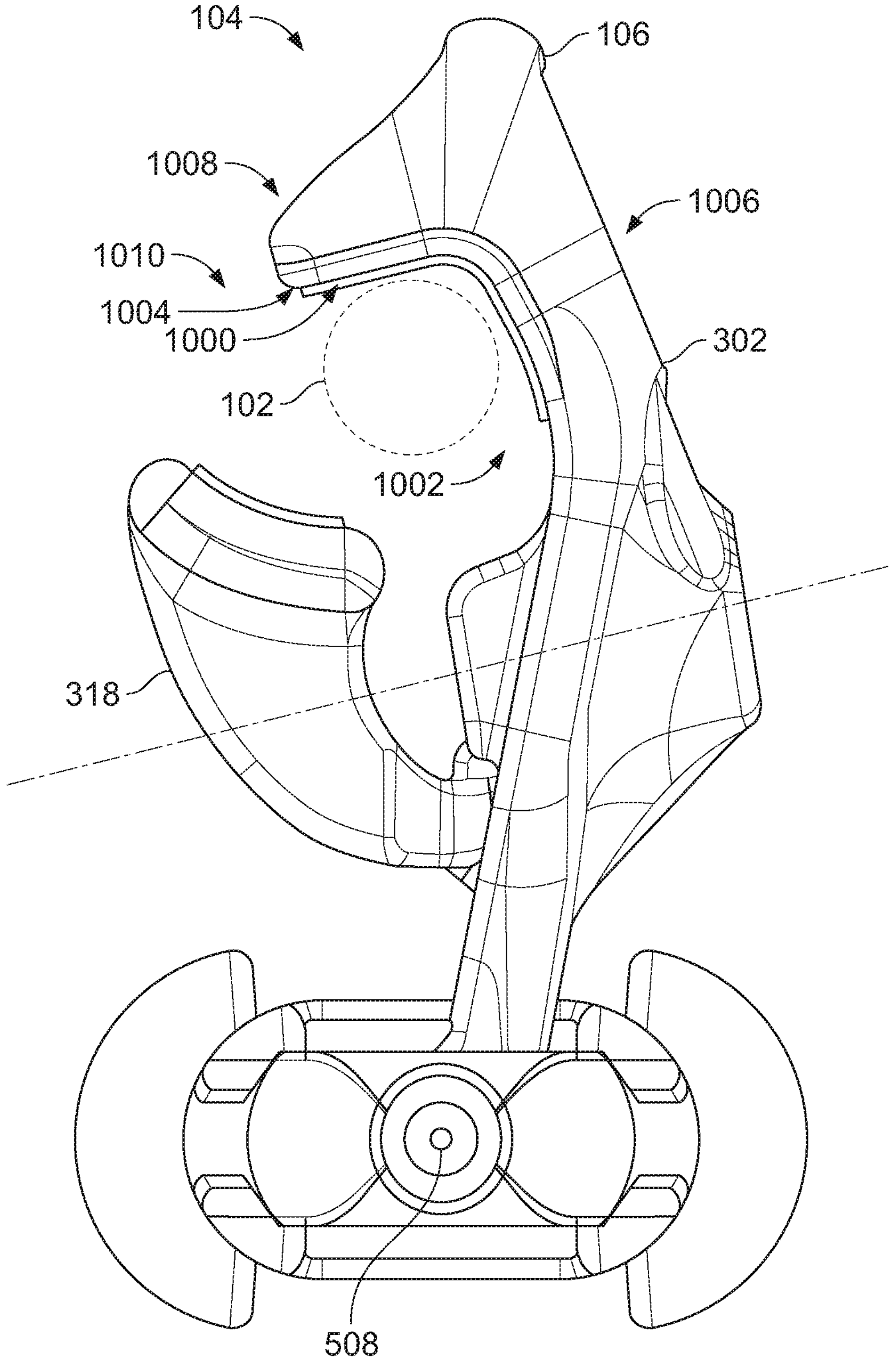
FIG. 10 illustrates an elevation view of the example vibration damper viewed along a flexible leg axis.

Referring to FIG. 10, an elevation view of the vibration damper 104 as viewed along the flexible leg axis 508 is illustrated. The attachment portion 302 is configured to be attached to the cable 102. The attachment structure 106 of the attachment portion 302 includes a cable contact surface 1000 extending from a first end 1002 to a second end 1004. The cable contact surface 1000 has a concave shape between the first end 1002 and the second end 1004 such that the cable contact surface 1000 is positioned on each of a first side 1006 of the cable 102, a top side 1008 of the cable 102, and a second side 1010 of the cable 102 when the attachment portion 302 is attached to the cable 102.

Figure 11:
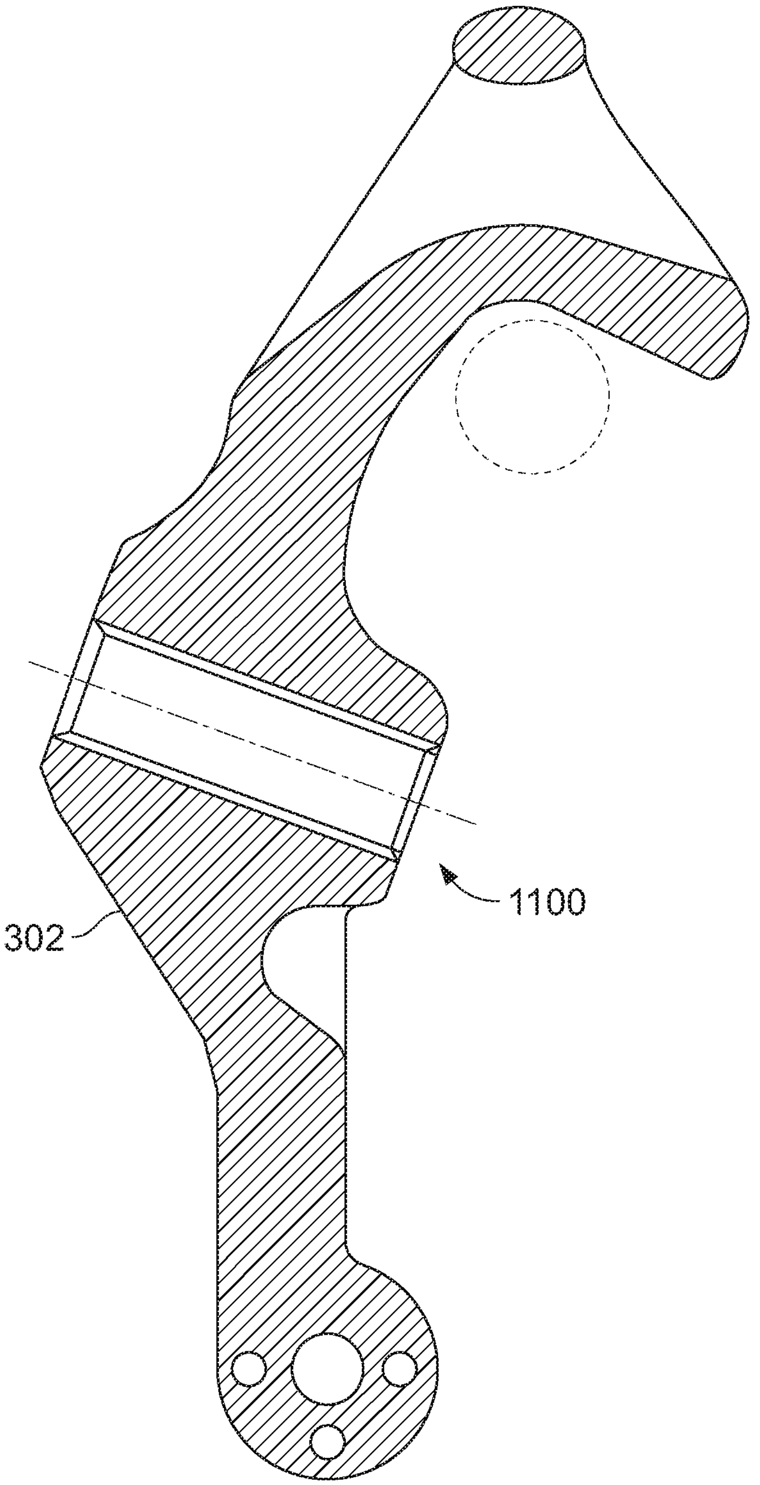
FIG. 11 illustrates a cross-section view of an attachment portion.

Referring to FIG. 11, a cross-section view of the attachment portion 302 is illustrated. As shown, the attachment portion 302 can define a through hole 1100 for the fastener 324 to pass through the attachment portion 302. In some examples, the through hole 1100 is threaded such that the fastener 324 cooperates with the threaded through hole 1100 to promote rotating the keeper 318 via linear motion of the fastener 324.

Figure 12:
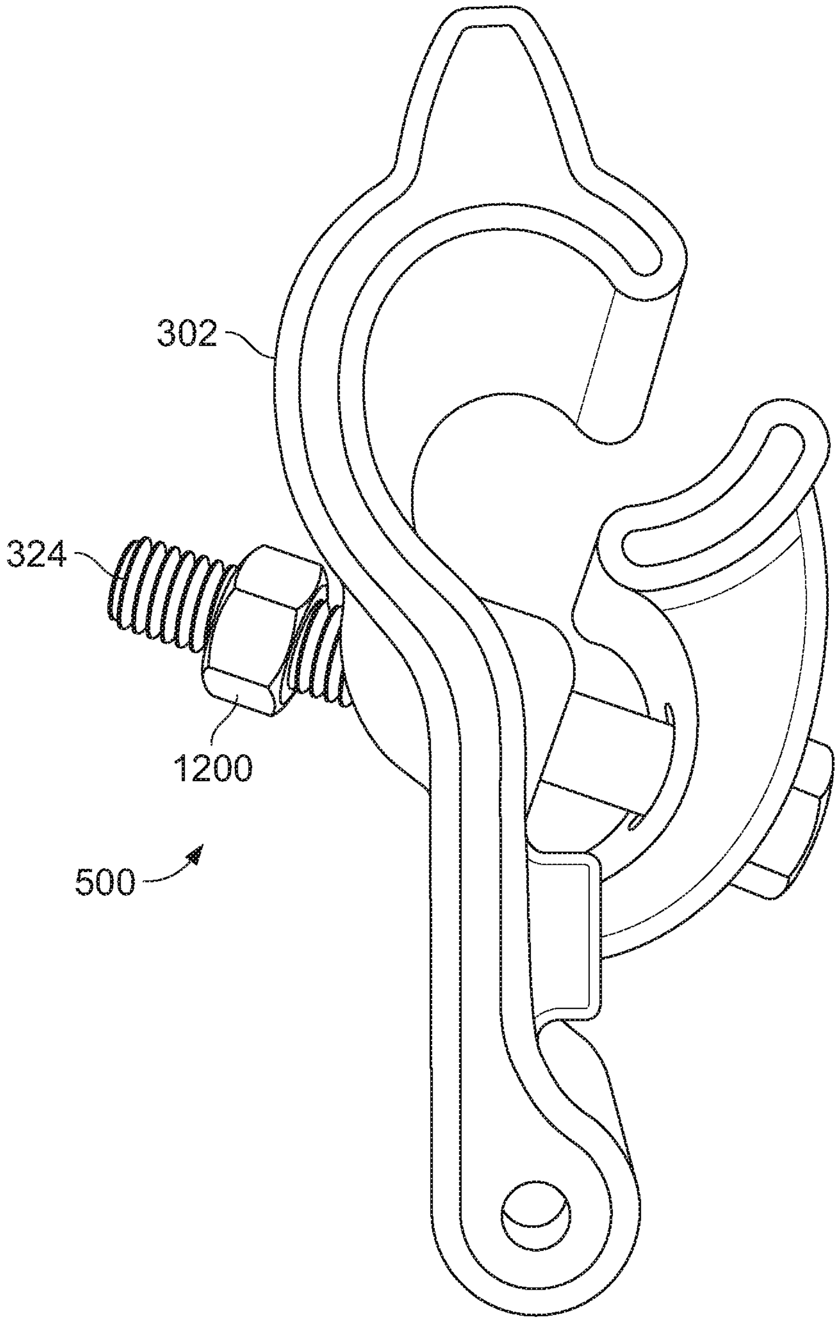
FIG. 12 illustrates a side view of the attachment portion, the keeper, and a fastener.

Referring to FIG. 12, a side view of the attachment portion 302, the keeper 318, and the fastener 324 is illustrated. As shown, a threaded nut 1200 can be applied to a portion of the fastener 324 on the second side 500 of the attachment portion 302. The nut 1200 can act as a positive location stop to prevent the fastener 324 from completely unthreading from the threaded through hole 1100.

Figure 13:
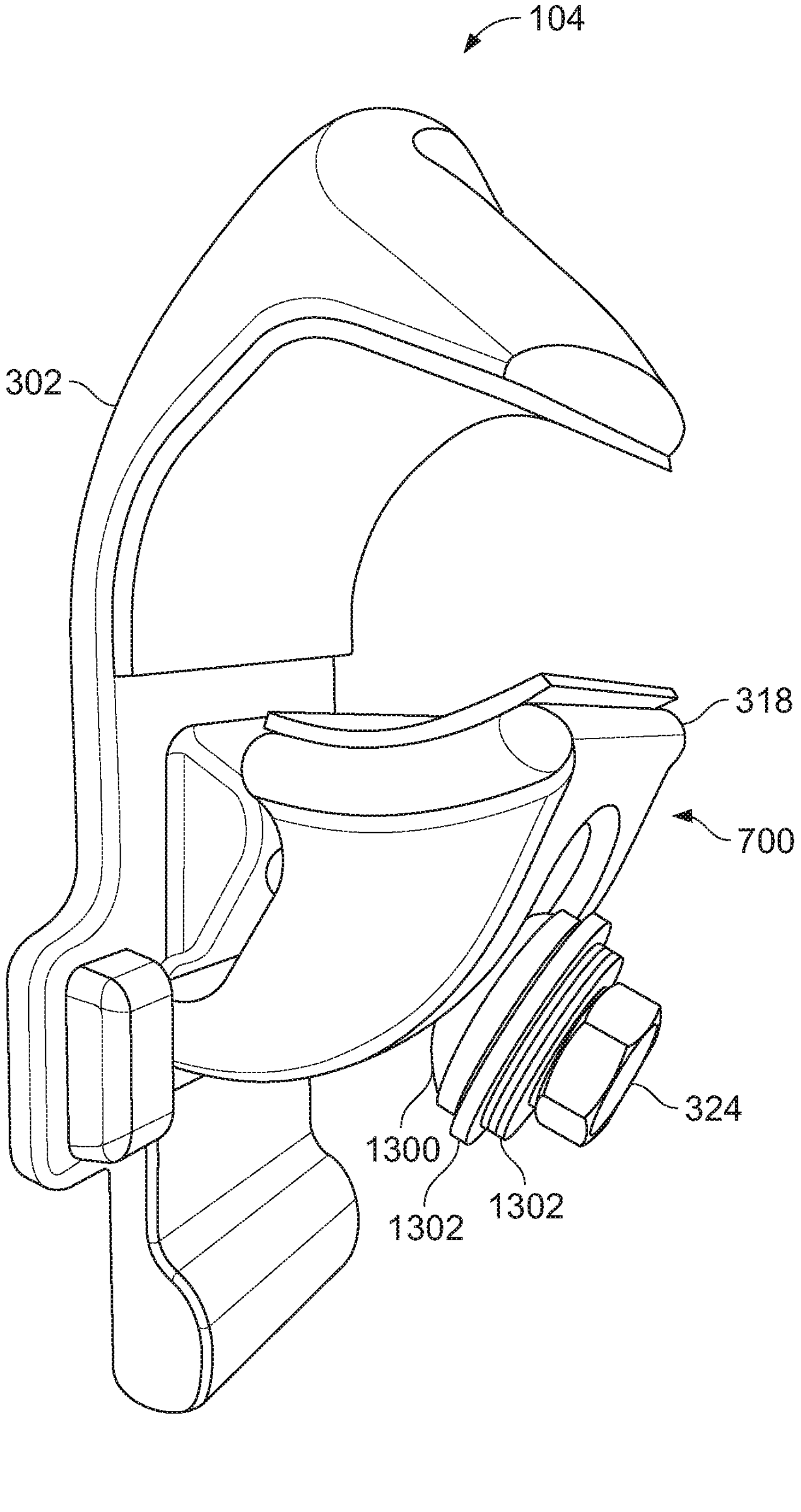
FIG. 13 illustrates a side view of the attachment portion and the keeper in the open position.

Referring to FIG. 13, a side view of the attachment portion 302 and the keeper 318 in the open position 700 is illustrated. As shown, the fastener 324 can include a series of washers to promote improved performance of the vibration damper 104. Closest to the keeper 318, a conical washer 1300 helps prevent washer deformation in the oblong hole defined by the keeper 318. Additionally, the conical washer 1300 can increase the amount of tension in the fastener 324 upon application of the vibration damper 104 to the cable 102. A series of Belleville washers 1302 can also be provided about the fastener 324. The Belleville washers 1302 can help increase the amount of tension in the fastener 324 similar to the conical washer 1300 while also providing improved resistance to vibratory unthreading of the fastener 324.

Figure 14:
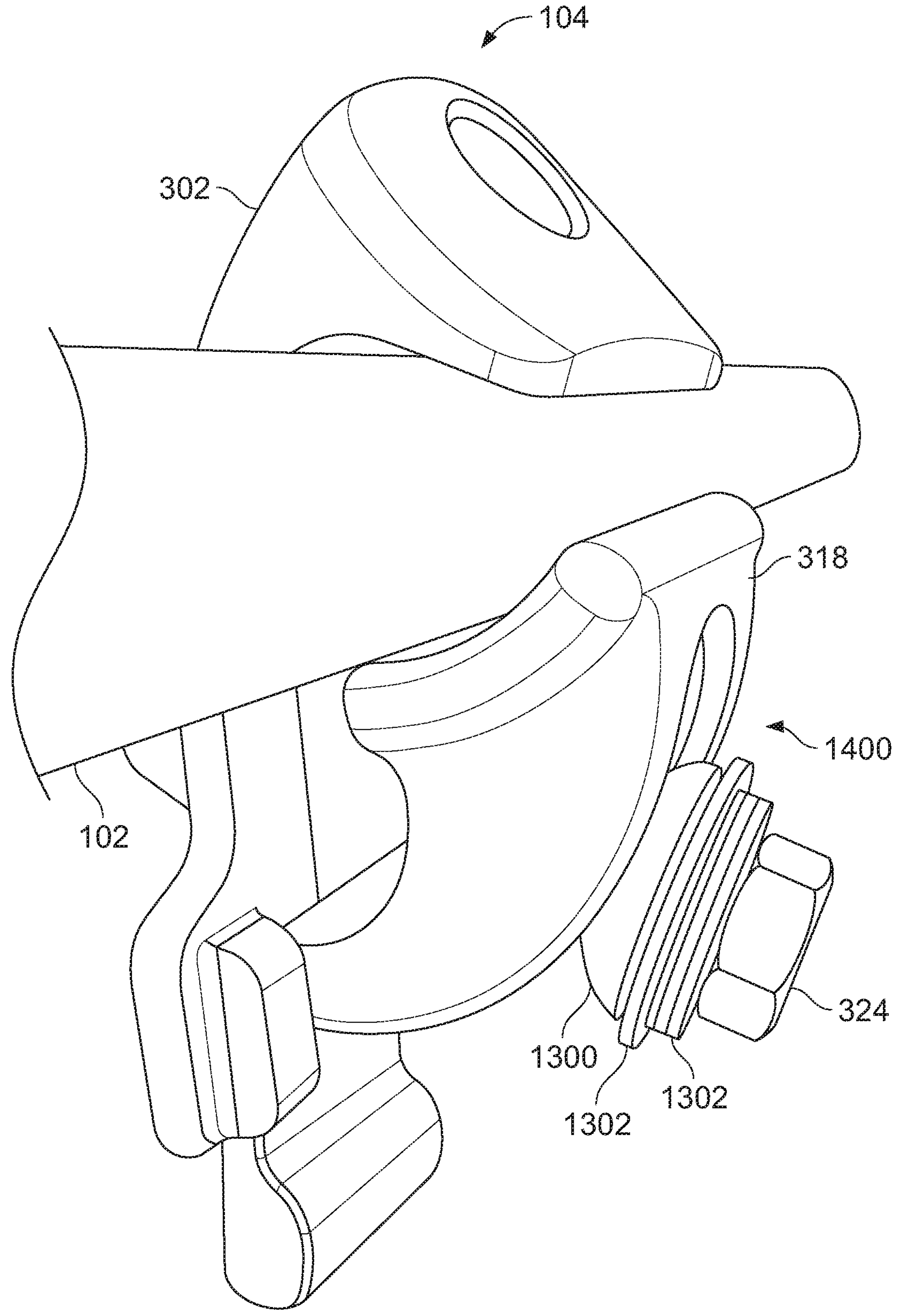
FIG. 14 illustrates a side view of the attachment portion and the keeper in a closed position.

Referring to FIG. 14, a side view of the attachment portion 302 and the keeper 318 in a closed position 1400 is illustrated. In order to attach the vibration damper 104 to the cable 102, the fastener 324 has been threaded into the attachment portion 302 to move the keeper 318 to the closed position 1400. The hot stick 400 (shown in FIG. 4) can include an attachment to operate (e.g., rotate) the fastener 324 such that the vibration damper 102 can be attached to the cable 102 while the cable 102 is transmitting electricity.

Figure 15:
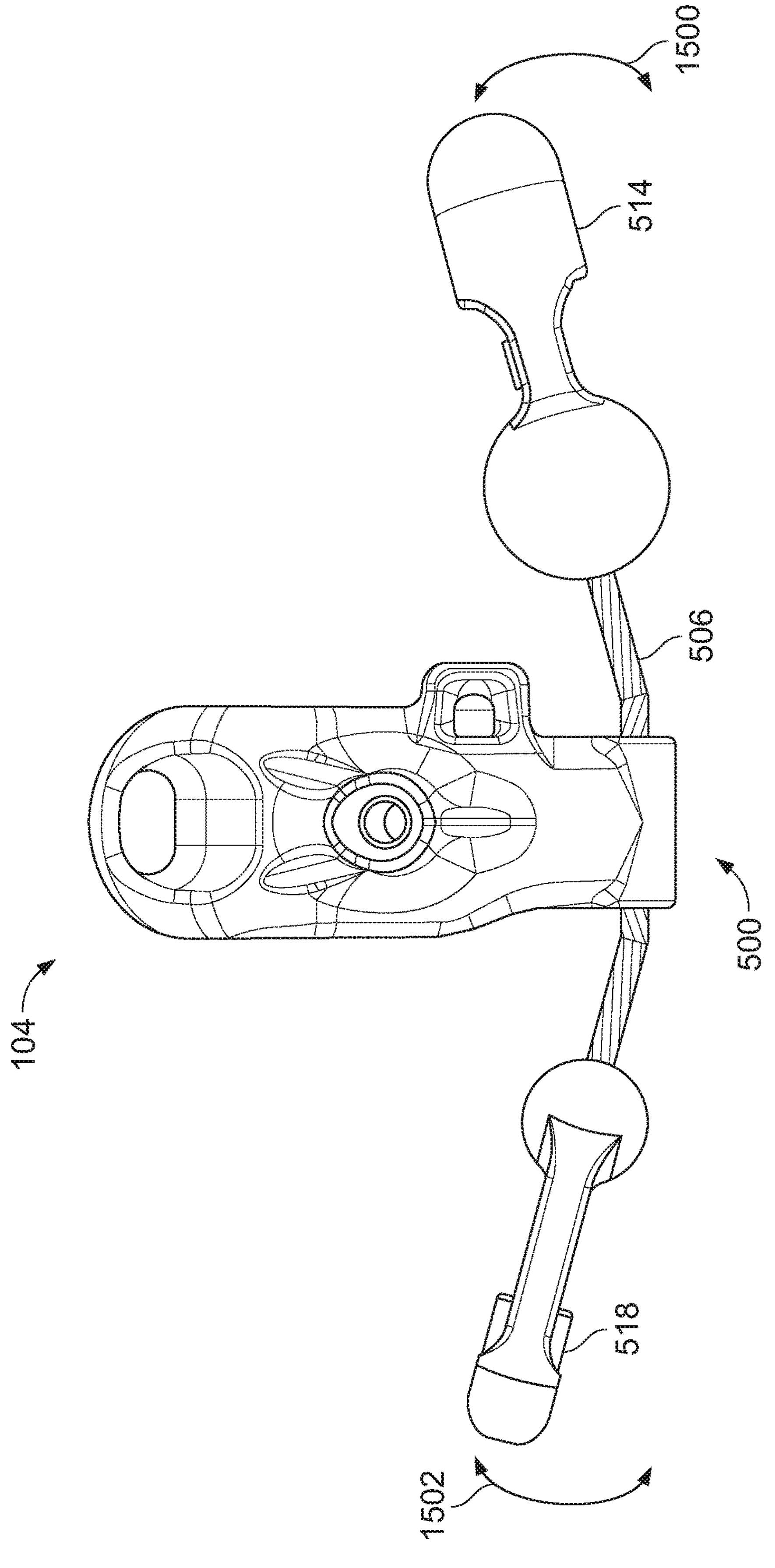
FIG. 15 is similar to FIG. 8 showing deflection of a weighted portion.

Referring to FIG. 15, an elevation view of the vibration damper 104 showing deflection of the weighted portion 514 and the second weighted portion 518 is illustrated. The deflection of the weighted portion 514 and the second weighted portion 518 may be exaggerated for clarity, however, the figure shows the deflection in a vertical plane (e.g., the second plane 704) relative to a ground surface. The rotation of the weighted portion 514 is generally shown by the arrow 1500 while the rotation of the second weighted portion 518 is generally shown by the arrow 1502. It is also contemplated that the weighted portion 514 and the second weighted portion 518 can move in directions outside of the vertical plane to dampen vibration of the cable 102.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A vibration damper for damping vibrations of an electrical transmission cable that is energized to transmit electricity, the vibration damper comprising:

- a clamp attachment portion configured to be attached, via clamping at a clamp segment of the clamp attachment portion, to the transmission cable with direct contact clamping engagement between the clamp segment of the clamp attachment portion and the transmission cable, the clamp attachment portion having an adjustment segment with an inner surface defining an opening, spaced from the clamp segment of the clamp attachment portion, whereby a hot stick placed in the opening can contact the inner surface to urge the clamp attachment portion into contact with the transmission cable while the transmission cable is energized to transmit electricity;
- a flexible leg portion attached to the clamp attachment portion; and
- a weighted portion attached to the flexible leg portion, the weighted portion spaced a separation distance from the clamp attachment portion and movable relative to the clamp attachment portion via the flexible leg portion to dampen the vibrations.

2. The vibration damper of claim 1, wherein the clamp attachment portion surrounds a portion of the flexible leg portion to attach the flexible leg portion to the clamp attachment portion.

3. The vibration damper of claim 1, wherein the weighted portion defines an opening into which a portion of the flexible leg portion is received to attach the weighted portion to the flexible leg portion.

4. The vibration damper of claim 1, comprising a fitting configured to attach the weighted portion to the flexible leg portion.

5. The vibration damper of claim 1, comprising an attachment structure attached to the clamp attachment portion and configured to attach the clamp attachment portion to the transmission cable.

6. The vibration damper of claim 1, comprising a second weighted portion, wherein:

the clamp attachment portion has a first attachment side and a second attachment side, a first portion of the flexible leg portion extends away from the first attachment side, a second portion of the flexible leg portion extends away from the second attachment side, the weighted portion is attached to the first portion of the flexible leg portion, the second weighted portion is attached to the second portion of the flexible leg portion, the weighted portion is spaced the separation distance from the first attachment side of the clamp attachment portion, and the second weighted portion is spaced a second separation distance from the second attachment side of the clamp attachment portion.

7. The vibration damper of claim 6, wherein the separation distance is not equal to the second separation distance.

8. The vibration damper of claim 1, wherein:

the transmission cable extends along a transmission cable axis, the flexible leg portion extends along a leg axis, and the leg axis and the transmission cable axis lie within a first plane perpendicular to a second plane within which the transmission cable axis lies.

9. A vibration damper for damping vibrations of an electrical transmission cable that is energized to transmit electricity, the vibration damper comprising:

a clamp attachment portion configured to be attached, via clamping, to the transmission cable, while the transmission cable is energized to transmit electricity, with direct contact clamping engagement between the clamp attachment portion and the transmission cable, the clamp attachment portion having a first structure;

a keeper attached to the clamp attachment portion, the keeper movable from an open position to a closed position to facilitate attaching the clamp attachment portion to the transmission cable, the keeper having a second structure, the second structure configured to cooperate with the first structure to maintain the keeper in a desired orientation relative to the clamp attachment portion as the keeper moves from the open position to the closed position, the clamp attachment portion or the keeper having a projection structure and the other of the clamp attachment portion or the keeper having a receptacle structure with an inner surface defining an aperture into which the projection structure extends and engages with the receptacle structure to facilitate moving the keeper from the open position to the closed position;

a flexible leg portion attached to the clamp attachment portion; and a weighted portion attached to the flexible leg portion, the weighted portion spaced a separation distance from the clamp attachment portion and movable relative to the clamp attachment portion via the flexible leg portion to dampen the vibrations.

10. The vibration damper of claim 9, wherein the keeper is moved between the open position and the closed position via operation of a tightening fastener.

11. The vibration damper of claim 9, wherein the protrusion is laterally offset from at least one of the first structure or the second structure in a direction along which the transmission cable extends when the clamp attachment portion is attached to the transmission cable.

12. The vibration damper of claim 9, wherein a resilient material is attached to at least one of the clamp attachment portion or the keeper to mitigate damage to the transmission cable.

13. The vibration damper of claim 9, wherein the transmission cable is a covered conductor.

14. A vibration damper for damping vibrations of an electrical transmission cable that is energized to transmit electricity, the vibration damper comprising:

a clamp attachment portion configured to be attached, via clamping, to the transmission cable with direct contact clamping engagement between the clamp attachment portion and the transmission cable, the clamp attachment portion having a transmission cable contact surface extending from a first end to a second end, the transmission cable contact surface having a concave shape between the first end and the second end such that the transmission cable contact surface is positioned on each of a first side of the transmission cable, a top side of the transmission cable, and a second side of the transmission cable when the clamp attachment portion is attached to the transmission cable;

a keeper movable from an open position to a closed position relative to the clamp attachment portion to facilitate attaching the clamp attachment portion to the transmission cable;

a hinge feature integral with the clamp attachment portion and the keeper to facilitate moving the keeper from the open position to the closed position while maintaining a desired orientation between the keeper and the clamp attachment portion;

a flexible leg portion attached to the clamp attachment portion; and a weighted portion attached to the flexible leg portion, the weighted portion spaced a separation distance from the clamp attachment portion and movable relative to the clamp attachment portion via the flexible leg portion to dampen the vibrations.

15. The vibration damper of claim 14, comprising a second weighted portion, wherein:

the clamp attachment portion has a first attachment side and a second attachment side, a first portion of the flexible leg portion extends away from the first attachment side, a second portion of the flexible leg portion extends away from the second attachment side, the weighted portion is attached to the first portion of the flexible leg portion, the second weighted portion is attached to the second portion of the flexible leg portion, the weighted portion is spaced the separation distance from the first attachment side of the clamp attachment portion, the second weighted portion spaced a second separation distance from the second attachment side of the clamp attachment portion, and the separation distance is not equal to the second separation distance.

16. The vibration damper of claim 15, wherein the weighted portion has a weight that is not equal to a second weight of the second weighted portion.

17. The vibration damper of claim 14, wherein the clamp attachment portion has an adjustment segment with an inner surface defining an opening, whereby a hot stick placed in the opening can contact the inner surface to urge the clamp attachment portion into contact with the transmission cable while the transmission cable is energized to transmit electricity.

18. The vibration damper of claim 14, wherein a resilient material is attached to the clamp attachment portion to mitigate damage to the transmission cable.

19. The vibration damper of claim 17, wherein the clamp attachment portion has a clamp segment at which the clamp attachment portion attaches to the transmission cable and the opening is spaced apart from the clamp segment.

20. The vibration damper of claim 14, wherein the transmission cable is a covered conductor.

* * * * *